Oct. 21, 1947. R. F. BANNOW Re. 22,929
ADAPTER WITH SWIVEL JOINT
Original Filed March 20, 1943
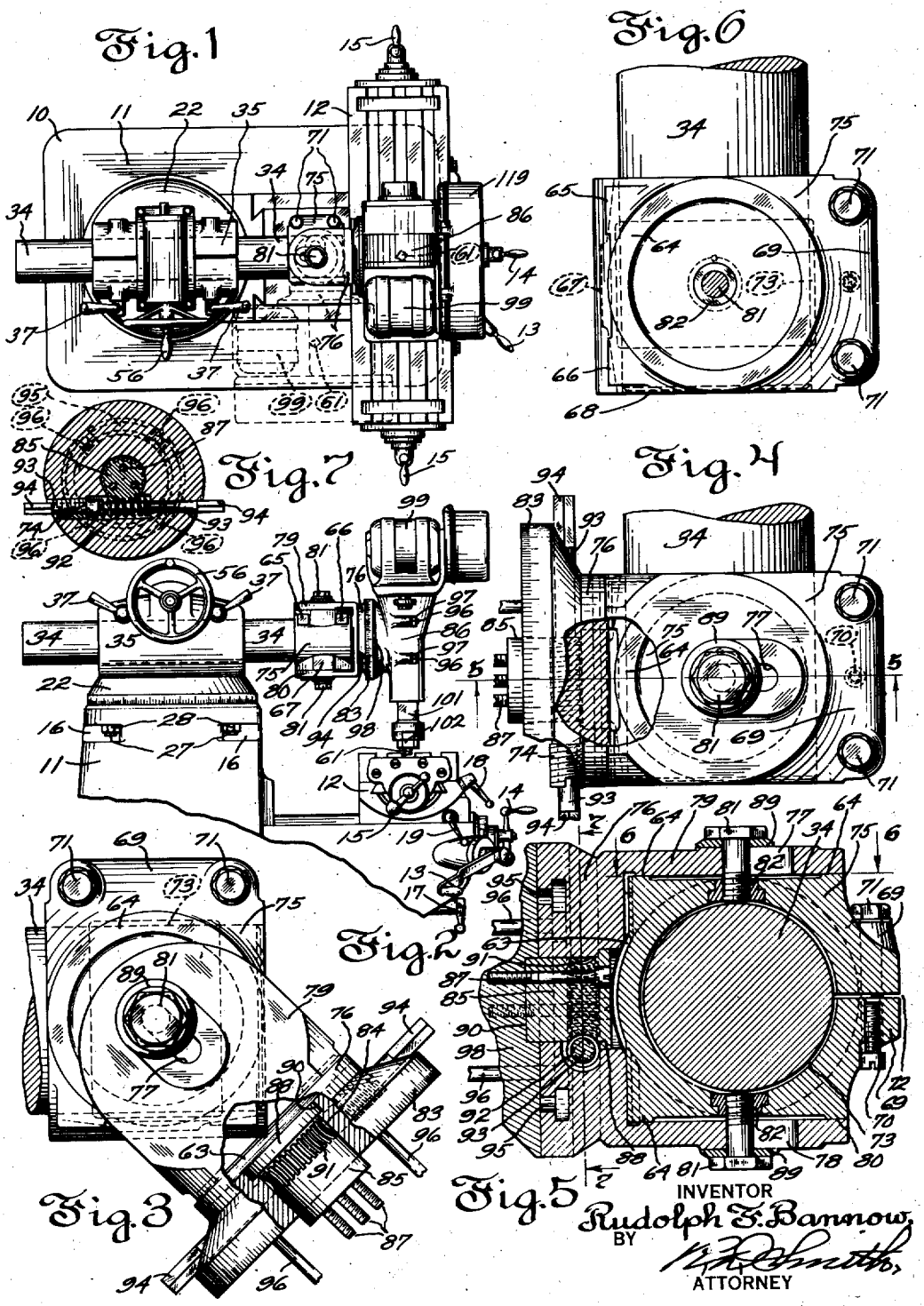
INVENTOR
Rudolph F. Bannow,
BY
ATTORNEY Reissued Oct. 21, 1947

Re. 22,929

UNITED STATES PATENT OFFICE 22,929

ADAPTER WITH SWIVEL JOINT

Rudolph F. Bannow, Easton, Conn.

Original No. 2,404,561, dated July 23, 1946, Serial No. 479,836, March 20, 1943. Application for reissue August 6, 1947, Serial No. 766,660

10 Claims. (Cl. 90—17)

This invention relates to adjustably jointed structures for mounting a portable self-powered work machining unit with its cutting or abrading tool upon some suitable projecting frame support. The support may constitute the horizontal overarm that projects from the standard of a floor type of milling machine. A machine tool of this type usually incorporates a movable table equipped to hold the work firmly in different positions while being machined by the cutting tool.

An articulated holding structure for this general purpose is disclosed in my United States Patent No. 2,275,291 wherein the self-powered work machining unit comprises a milling attachment incorporating a rotary cutter. A similar use for like holding structure, but wherein the self-powered work machining unit incorporates a lengthwise reciprocative cutter such as a file, slotter or broach, is disclosed in an application copending herewith, Serial No. 474,650, filed February 4, 1943.

As proposed for use with each of the foregoing articulated holding structures the horizontal overarm of the milling machine has been capable of being adjustably turned upon its longitudinal axis in relation to the machine frame or standard by which it is supported. In some cases however this overarm, or the equivalent projecting primary means of support for the self powered machining unit, may not be capable of rotary adjustment about its own axis relative to the machine frame. Where this condition has been present in former cases, it has undesirably reduced the number of angular directions in which the work cutting tool can be inclined while operating on the work.

One object of the present improvements is to provide an adjustably jointed supporting structure which will compensate for inability of the overarm to be adjusted rotatably or to measurable degrees about its own longitudinal axis so that there is preserved or restored to the cutting tool as many possible angles of operating inclination as is possible to a self-powered machining unit supported upon a rotatable overarm.

A further object of the present improvements is to permit the self-powered machining unit at times to be bodily shifted lengthwise of the overarm in cases where the latter is not itself longitudinally slidable with respect to the machine frame from which it projects.

Another object of the invention is to support a self-powered machining unit on the end of a horizontal overarm that is fully cylindrical throughout its entire length, yet in a manner enabling the machining unit to be swung bodily about a hinge axis perpendicularly related to the longitudinal axis of the overarm. Additional advantages may arise if the hinge axis is arranged actually to intersect the overarm axis.

Another object is to so mount the said machining unit that it can swivel relative to the overarm in a plane parallel with the aforesaid hinge axis while such hinge axis remains fixed with respect to the overarm and also while the axis about which said unit swivels aligns or is coincident with the axis of the overarm.

A further object is to firmly establish positions for the machining unit as a whole at opposite extremes of its 90 degree range of swinging movement about the said hinge axis relative to the overarm.

A further object is to effect swiveling adjustment of the machining unit as a whole by means of gear toothed devices which shall at all times serve to relieve the operator of the necessity for manually supporting any heavily weighted, off-center portions of the machining unit while its bodily position is being readjusted.

A further object is to provide a novelly constructed hinge bracket so jointed that two relatively swingable sections thereof are so related that one of said sections can be freed and turned adjustably about the longitudinal axis of the overarm as well as freed to slide lengthwise on the latter, and the other of said sections can support the machining unit in a manner enabling the latter to swivel adjustably with respect to it.

A still further object is to combine with more than ordinary compactness and within a unitary section of a jointed support structure, a kind of removable trunnion that shall afford swivel support for a self-powered machining unit, together with transmission gearing that shall be operative to effect and maintain changes in the bodily positioning of the machining unit.

The foregoing and other related objectives will appear in greater particular from the following description of a preferred embodiment of the invention selected from numerous possible forms of the present improvements for illustrative purposes only, and in which description reference is made to the accompanying drawing wherein:

Fig. 1 is a plan view of a complete machine tool of the floor standard type incorporating a slotting attachment supported thereon through the medium of a jointed angle bracket embodying the present improvements.

Fig. 2 is a fragmentary view of the same machine tool in side elevation showing the slotting attachment in full.

Fig. 3 is an enlarged plan view of the jointed angle bracket alone with part of its structure broken away to disclose concealed parts, the hinged together sections of the bracket being obliquely related as when adjusting between extreme limits of their relative movement.

Fig. 4 is a plan view of the bracket sections of Fig. 3 established at one extreme of their range of adjustive movement opposite to that position shown in full lines in Fig. 1 and which serves to bring the self powered machining unit into its broken line position in Fig. 1.

Fig. 5 is a view taken in section on the plane 5—5 in Fig. 4 looking in the direction of the arrows.

Fig. 6 is a view taken in section on the plane 6—6 in Fig. 5 showing only the overarm embracing section of the hinge bracket.

Fig. 7 is a fragmentary plan view taken in section on the planes 7—7 in Fig. 5 looking in the direction of the arrows.

Conventional parts of a milling machine type of machine tool are indicated in Figs. 1 and 2 comprising the floor base 10, the frame standard 11 and a movable work holding table 12 which can be shifted vertically by the usual screw handle 13, as well as backward and forward by the usual screw handle 14, and also side to side by the usual screw handle 15. The turret 22 is securable on top of frame standard 11 in any position to which it may be turned about a vertical axis by tightening nuts 28 on the ends of clamp bolts 27 in the niches 16. These and other details of the main machine may be constructed as fully disclosed in my aforesaid United States Patent No. 2,275,291.

As further disclosed in said patent the turret head 22 is hallow and provides rotary bearings which also serve as slide bearings in which is slidably journaled a sturdy elongated overarm 34. According to the present improvements this overarm may be cylindrical throughout its entire length. The overarm is rotatable through 360 angular degrees of turning in its said bearings as well as slidable lengthwise therein. The crown wall 35 of the turret contains a split disposed lengthwise of the overarm which enables its side halves to be sprung toward each other by means of draw bolt handles 37 thereby to clamp and hold the overarm immovable. However there may be mechanism on the inside of the particular turret 22 here disclosed which could be constructed and operated by hand wheel 56 as disclosed in my aforesaid Patent 2,275,291 for rotating overarm 34 about its own longitudinal axis while permitting the overarm to be shifted horizontally lengthwise of the turret to any desired extent when handles 37 are turned to loosen their draw bolts.

The work machining unit or attachment herein chosen as illustrative of any portable self-powered machining unit may be constructed like that disclosed in copending application, Serial No. 474,650. It will suffice here to explain that this machining unit will ordinarily include a main body portion such as crank case 86 in which there may be guided lengthwise the shank 101 of a tool holder 102 carrying a broach 61 or other form of work cutting tool adapted to be reciprocated lengthwise by the running of power motor 99 and preferably at various speeds determined by a variable speed power transmission such as stepped pulleys housed within casing 119. The foregoing and other details of the possible construction and operation of a self-powered machining unit will be found in the aforesaid copending application Serial No. 474,650. Its operation enables a work piece held on table 12 to be cut while the axis of the tool is disposed in any desired location relative to the work as well as while the tool axis is disposed at any desired angle to the work. A milling attachment like that disclosed in my aforesaid patent may take the place of or be used in conjunction with the slotting attachment above described as fully appears in the disclosure of the said copending application.

The portion of the work machining unit, whether it be a slotting attachment or a milling attachment, which is of most concern to the present improvements consists of a circular mounting flange 98 presenting a flat face laterally of crank case 86 penetrated by tightening bolts 96 of which there may be four equally spaced about a circle near the periphery of mounting boss 98 as shown in Fig. 7. The otherwise flat face of circular flange 98 may be centrally recessed at 90 for receiving and locating fixedly thereon the end of the journal forming shank of a stub-shaft or trunnion 85 snugly fitting recess 90. This trunnion has a thrust affording head 88 of enlarged diameter and is detachably held to crank case 86 by holding screws 87. The shank of trunnion 85 is journaled in a central bore 84 in one swingable section of my improved jointed hinge bracket, which section I shall refer to as yoke section 76. Bore 84 is counterbored to accommodate the trunnion head 88. The foregoing construction is shown most clearly in Figs. 3 to 6; inclusive.

The journaled periphery of trunnion 85 has sunken gear teeth 91 cut into it all the way around to form in effect a worm wheel. These sunken gear teeth 91 are in mesh with a worm 92 fixed on a cross shaft 93. As best shown in Fig. 7, shaft 93 has one end journaled directly in the structure of yoke 76 and has its other end journaled in an externally threaded bushing 74 larger in diameter than worm 92 and removably lodged in the structure of yoke 76. Shaft 93 carries at each of its ends outside of the yoke structure the squared terminals 94 to which may be applied a removable handle or wrench (not shown herein) for turning the shaft 93 and hence worm 92. There may be a scale of angle measuring graduations 83 on the periphery of yoke section 76 and there may be an index or zero mark with suitable vernier or other indicia on the periphery of the mounting flange 98 of the machining unit to accord with such graduations for determining the angular extent of swiveling movement of the machining unit relative to yoke section 76.

For firmly holding these two parts together in every swiveled relationship to which they may be turned, there is sunken in the flat face of mounting flange 76 an annular slot 95 of T-shape cross-section which accommodates the square heads of clamp bolts 96 whose threaded ends project forward and out of the mounting flange 98 of crank case 86 and thereat take tightening nuts 97.

The collar section 75 of the improved jointed angle bracket occupies the space between the top arm 79 and the bottom arm 80 of yoke section 76 and is of hollow block-like nature bored to fit and adjustably embrace the fully cylindrical end of overarm 34. A mean portion of collar section 75 is bored oversize at 73 to avoid having to nicely finish a needless extent of bearing surface for contact with the periphery of the overarm. The wall of member 75 is split at 72 and provided with lugs to receive two tightening bolts 71 which pass through clearance holes in the lug on one side of split 72 and which have threaded engagement with the lug on the other side of the split. The lower lug in Fig. 5 also carries a slot spreading screw 70 in threaded engagement therewith whose top end may thrust against the lug on the opposite side of the split so as to spread the split and cause member 75 to reduce the tightness of its hug on overarm 34.

Hinge bolts 81 pass with a clearance fit respectively through elongated slot 77 in the top arm 79 of yoke section 76 and through a similar elongated slot 78 in the bottom yoke arm 80 and have threaded engagement with hardened threaded bushings 82 lodged immovably in section 75. Thrust washers 89 separate the heads of hinge bolts 81 from raised faces of bosses bordering around slots 77 and 78 on the outer surfaces of yoke arms 79 and 80.

Further features of construction of the jointed angle support bracket consist in the following. Fig. 1 shows that the smoothly finished flat-faced crotch of yoke section 76 is seated firmly in surface contact with the smooth flat-faced end 68 of collar section 75. The exterior of this collar section, on the opposite side of overarm 34 from lugs 69 and split 72, is provided with three spaced seating pads or bosses 65, 66 and 67 in triangular relationship whose flat faces are coplanar and afford three-point seating abutment for the flat crotch face of yoke section 76 when the latter is positioned as in Figs. 4 and 5. The flat face of section end 68 at one time, and the coplanar bosses 65, 66, 67 at another time, firmly and definitely establish the self-powered machining unit at the opposite limits of its exactly ninety degree range of swinging movement about the common axis of hinge bolts 81. This axis preferably intersects the longitudinal axis of overarm 34 and is perpendicular thereto. On the top and bottom exterior of collar section 75 there are provided annular thrust surfaces 64 raised in relief and finished flat and smooth to swivel in contact with the flat smooth inside surfaces of yoke arms 79 and 80, respectively.

Figs. 3 and 5 show that the flat crotch surface which faces seating pads 65, 66 and 67 is concavely hollowed out at 63 to clear the rounded convex exterior of collar section 75 which bulges outward somewhat between lower seating pad 67 and upper seating pads 65, 66. Fig. 3 shows that the elongated slot 77 permits pulling the yoke section away from concentric relation to the collar section far enough to permit hollow 63 to clear the outer corner of the collar section while swinging the yoke section past it about the hinge bolts 81. Greater compactness of the jointed hinge bracket as a whole is thus made possible and less size and weight of material is required in its construction without sacrificing strength, than would be the case if yoke section 76 were limited to swinging about a fixed hinge axis.

The manner of operating the improved jointed attachment structure in a manner to incline the longitudinal axis, or the stroking direction, of the cutting tool 61 into any angular relationship of the work will for the most part be obvious from the foregoing description. Ordinarily the work table 12 will be set in lower position relative to the cutting tool 61 by means of handles 13, 17 than is shown in Fig. 2, this view being vertically contracted to save space in the drawing. In the position of parts shown in Figs. 1 and 2 the tool holder 101 will reciprocate in a true vertical path either at the location of tool 61 shown in full lines, or at the broken line location of such tool which is attained by adjustively shifting yoke section 76 and its carried work machining unit to broken line position in Fig. 1. This is done by loosening the hinge bolts 81 so the yoke section may be shifted radially outward and swung past the corner of the collar section 75 as indicated in Fig. 3. Either in the full line or the broken line position in Fig. 1, crank case 86 bodily may be swiveled about the axis of trunnion 85 and carry the axis of cutting tool 61 to any desired angle of inclination in relation to the work. These two means of adjustment coupled with the ability of the collar section 75 to itself swivel about overarm 34, as well as to slide lengthwise thereof when fastening bolts 71 are loosened, gives to any self-powered machining unit supported by means of my improved jointed hinge bracket full ability to be located and inclined in as many different ways and positions as can be located and disposed the self-powered machining unit of the aforesaid patent and pending application even if the overarm 34 itself be rotatively fixed in turret 22. It is of course understood that after any adjustive shifting of the position of the machining unit, all holding bolts will be thoroughly retightened to prevent accidental disturbance of the thus established position of the machining unit. The turning of crank case 86 relative to the yoke section 76 by means of worm 93 and worm gear 91 will at all times relieve the operator from having forcefully to lift or support any heavy part of the machining unit that hangs off balance even though retaining nuts 97 are loosened. In the appended claims the face of flange 98 is sometimes referred to as a mounting face while the flange-like head of yoke section 76 is referred to as a head wall presenting a swivel seat for mating contact with such mounting face of flange 98.

While as herein shown, the projected axis of trunnion 85 is coincident with the axis of overarm 34 in Fig. 2, these axes could to advantage for some purposes be so related that one is in eccentric relation to the other, in which case the crank case 86 in Fig. 2 would be adjusted about a different center when frame 98 is swiveled in relation to yoke section 76 than when collar section 75 is rotated about overarm 34. A greater variety of possible positions for the self-powered machining unit results. Many other modifications of the precise shapes, sizes and relationships of the structures here disclosed will be recognized as possible of incorporating the useful principles of this invention. Hence the patent to be granted will be understood as contemplating and intending to cover all variations of and substitutes for the particular embodiment herein disclosed which come fairly within the broadest reasonable interpretation of the claims.

I claim:

1. The combination with a machine attachment having a laterally disposed mounting face by means of which said attachment may be supported in adjustable positions of, a supporting bracket including a head wall presenting a swivel seat for mating contact with said mounting face and containing a bearing hole, a central recess in said mounting face, a trunnion received in and snugly fitting said recess and journaled in said bearing hole and having worm wheel teeth radially within the compass of the journaled surface of said trunnion, holding bolts penetrating said trunnion having threaded engagement with said machine attachment, said trunnion being shaped to prevent separation of said mounting face from said swivel seat, a worm in mesh with said teeth rotatably carried by said supporting bracket, and means releasably to lock said machine attachment against swiveling movement about said trunnion relative to said supporting bracket.

2. The combination with a machine attachment having a laterally disposed mounting face by means of which said attachment may be supported in adjustable positions of, a supporting bracket including a head wall presenting a swivel seat for mating contact with said mounting face and containing a bearing hole, a central recess in said mounting face, a trunnion received in and snugly fitting said recess journaled in said bearing hole and having worm wheel teeth radially within the compass of the journaled surface of said trunnion, holding bolts penetrating said trunnion having threaded engagement with said machine attachment, a shoulder on said trunnion preventing separation of said mounting face from said swivel seat, a worm in mesh with said teeth rotatably carried by said supporting bracket, an annular anchorage groove sunk in said swivel seat, tightening bolts penetrating said mounting face having flatted heads occupying and prevented from turning by said anchorage groove, and manually accessible nuts on said bolts at the exterior of said machine attachment.

3. The combination with a cylindrical machine overarm and a machine attachment having a laterally disposed mounting face by means of which said attachment may be supported in adjustable positions on said overarm of, a supporting bracket including a head wall presenting a swivel seat for mating contact with said mounting face and having two spaced hinge arms forking from said wall in a direction away from said mounting face, said wall containing a bearing bore opening into the space between said hinge arms, a trunnion in fixed relation to said mounting face journaled in said bearing bore, means to prevent separation of said head wall from said swivel seat, means releasably to lock said machine attachment against swiveling movement with said trunnion relative to said supporting bracket, a collar section turnably sleeved on said overarm comprising a hollow block like body straddled by said hinge arms, and pivotal connection between said hinge arms and said collar section.

4. The combination with a cylindrical machine overarm having a longitudinal axis of, a machine attachment having a laterally disposed mounting face by means of which said attachment may be supported in adjustable positions on said overarm, a supporting bracket including a head wall presenting a swivel seat for mating contact with said mounting face and having two spaced hinge arms forking from said wall in a direction away from said mounting face, said wall containing a bearing bore opening into the space between said hinge arms, a trunnion in fixed relation to said mounting face journaled in said bearing bore, means to prevent separation of said head wall from said swivel seat, means releasably to lock said machine attachment against swiveling movement with said trunnion relative to said supporting bracket, a collar section turnably sleeved on said overarm comprising a hollow block-like body straddled by said hinge arms and connections between said hinge arms and said collar section forming a hinge pivot whose axis coincides at least at one point with said longitudinal axis of the overarm.

5. In a machine tool of the type including a frame standard higher than its associated work holding table, the combination with said standard of, a work machining unit including an elongated tool shank power driven with respect to its longitudinal axis while said axis is variously stationed and inclined in relation to work secured on said table in fixed relation to said standard, an overarm supported by said frame standard, and an articulated structure for supporting said machining unit at various stations for operating on said work including at least three support sections, the first of said sections comprising said overarm, the second of said sections comprising a collar turnably sleeved on said overarm, and the third of said sections comprising a yoke straddling and pivotally connected to said collar and coupled adjustably to said machining unit.

6. In a machine tool as described in claim 5, the combination defined in said claim, together with worm and gear connections between the said yoke and the said machining unit.

7. An adjustably jointed support structure for mounting a portable self-powered work machining unit on a non-rotatable overarm, comprising a collar block having a bore thereby to turnably sleeve on the overarm, and a bracket including a head wall for supporting said machining unit in variable relation to said block and spaced arms rigid with said head wall straddling and pivoted to said collar block to swing relative to the latter about an axis crosswise of the axis of said bore.

8. The combination with a work machining attachment having a mounting face by means of which said attachment may be supported in rotatably adjustable positions of, a supporting bracket including a head wall presenting a swivel seat in mating relation to said mounting face and containing a bearing hole, a trunnion in fixed relation to said mounting face journaled in said bearing hole, means to prevent separation of said mounting face from said swivel seat, and gear connections between said brackets and said trunnion constructed and arranged to cause and control selective degrees of swiveling movement of said mounting face with said trunnion relative to said swivel seat including gear teeth carried by said trunnion and a gear rotatably carried by said supporting bracket.

9. The combination with a work machining attachment having a mounting face by means of which said attachment may be supported in rotatably adjustable positions of, a supporting bracket including a head wall presenting a swivel seat in mating relation to said mounting face and containing a bearing hole, a trunnion in fixed relation to said mounting face journaled in said bearing hole, means to prevent separation of said mounting face from said swivel seat, and gear connections between said bracket and said trunnion constructed and arranged to cause and control selective degrees of swiveling movement of said mounting face with said trunnion relative to said swivel seat including gear teeth formed in the surface of said trunnion and a gear in mesh with said teeth rotatably carried by said supporting bracket.

10. The combination with a work machining attachment having a mounting face by means of which said attachment may be supported in rotatably adjustable positions of, a supporting bracket including a head wall presenting a swivel seat in mating relation to said mounting face and containing a bearing hole, a trunnion in fixed relation to said mounting face journaled in said bearing hole, means to prevent separation of said mounting face from said swivel seat, and gear connections between said bracket and said trunnion constructed and arranged to cause and control selective degrees of swiveling movement of said mounting face with said trunnion relative to said swivel seat including worm wheel teeth formed in the surface of said trunnion radially within the compass of the journaled surface of the latter, and a worm in mesh with said teeth rotatably carried by said supporting bracket.

RUDOLPH F. BANNOW.